United States Patent [19]
Gray

[11] Patent Number: 4,829,935
[45] Date of Patent: May 16, 1989

[54] ANIMAL FEEDING DEVICE
[76] Inventor: James A. Gray, 601 S. Swain St., Bloomington, Ind. 47401
[21] Appl. No.: 77,670
[22] Filed: Jul. 24, 1987
[51] Int. Cl.4 .................................. A01K 5/00
[52] U.S. Cl. ....................... 119/54; 222/511; 119/56 R
[58] Field of Search .............. 119/51 R, 52 A, 53.5, 119/54, 56 R, 70; 222/547, 511, 508, 505

[56] References Cited
U.S. PATENT DOCUMENTS

| 484,442 | 10/1892 | Magoon | 119/53.5 |
|---|---|---|---|
| 1,112,068 | 9/1914 | Keller | 119/70 |
| 1,118,629 | 11/1914 | Bowers | 119/70 |
| 1,132,973 | 3/1915 | Rappleye | 119/52 A |
| 1,212,937 | 1/1917 | Good | 119/53.5 |
| 4,242,985 | 1/1981 | Freeborn | 119/54 |
| 4,530,448 | 7/1985 | Ponyicky | 222/511 |

FOREIGN PATENT DOCUMENTS 735553 11/1932 France .................. 119/53.5

Primary Examiner—Gene Mancene
Assistant Examiner—R. Thomas Price

[57] ABSTRACT

An animal feeding device including a housing defining an upper food storage compartment having a bottom discharge opening, a closure slidably mounted below the compartment for opening and closing the discharge, an arm pivotally mounted to the housing and connected with the closure for moving the closure between the open and closed positions, and moveable tabs between the arm and the closure to vary the manner of engagement between the two, thereby varying the movement of the closure in response to movement of the arm.

6 Claims, 5 Drawing Sheets

ANIMAL FEEDING DEVICE

BACKGROUND OF THE INVENTION

1. Field of the Invention

The present invention relates to the field of automatic feeding devices for animals, and more particularly to a device for feeding cats and which is specifically adapted for activation by a cat.

2. Description of the Prior Art

Automatic feeding devices for animals have been well known in the prior art. Such devices are usually designed for use by certain types of animals and in given situations. The primary purpose of such devices is to permit feeding of animals without the need for a person to be present each time. For example, some devices have operated to dispense a certain amount of feed at predetermined time intervals. Others act simply to protect the food from adverse weather or the like until the animal takes the food. The present invention is particularly adapted for permitting a cat to activate the dispensing of its food when desired, while being so configured as to prevent certain other types of animals, such as dogs, from being able to operate the device and obtain the food.

In U.S. Pat. No. 110,015, issued to Daniels on Dec. 13, 1810, there is described a Feed Trough intended to limit the amount of feed dispensed to a horse or similar animal. The Daniels device includes a wedge-shaped feed bin having a bottom discharge directed to the trough. A back panel of the bin is hinged at its top to permit the panel to be moved backwardly, opening the bottom discharge and releasing feed to the trough. A spring or other biasing device normally maintains the back panel in a position closing the bottom discharge. In operation, a horse or the like will move the back panel backwards and feed is dispersed into the trough for eating. A similar animal feeding device is disclosed in U.S. Pat. No. 2,673,551, issued to McAnly on Mar. 30, 1954. The McAnly device includes a vertically-movable board at the bottom of a feed bin and above a feed trough. A feeding animal will lift the board with its tongue, releasing more feed to the trough.

An automatic animal feeder is described in U.S. Pat. No. 4,235,200, issued to Shay on Nov. 25, 1980. The Shay device operates electronically to dispense a predetermined amount of feed into a tray accessible to an animal. A timer is used to cause dispensing of the feed at selected time intervals.

An animal training food dispenser is disclosed in U.S. Pat. No. 3,204,608, issued to Snitz on Sept. 7, 1965. This device includes a food container with a bottom discharge opening and a pivoted closure at the opening. An animal may lift a lever mounted to the outside of the Snitz device to pivot the closure and release a unit of food. The device is intended as a means for training an animal to perform a given task, such as moving the outside lever. A more complicated trained animal feeder is disclosed in U.S. Pat. No. 2,796,044, issued to Breland on June 18, 1957. This device dispenses a disc of different colors onto a support, and a trained animal will respond according to the animal's training regarding the color of the disc. Feed is then given to the animal as a reward for the animal's response.

In U.S. Pat. No. 434,806, issued to Reed on Aug. 19, 1890, there is described a feed trough which is operable remotely. The Reed device includes storage bins having pivoted barriers closing off the bottom discharge opening. A wire or the like is attached to a lever operating the barriers, and pulling of the wire from a remote location releases the lever and the weight of the feed forces the barrier to pivot and discharge the feed to a lower feed trough. A similar animal feeder is described in U.S. Pat. No. 4,522,152, issued to Meyer on June 11, 1985. The Meyer device includes a cylindrical receptacle mounted horizontally below a feed bin. The receptacle has a longitudinal slot to permit feed to enter the cylinder. The cylinder is then rotatable to discharge feed from within the cylinder, while retaining feed within the bin. The device is operable by a person rotating an outside handle connected with the cylinder.

SUMMARY OF THE INVENTION

Briefly describing one aspect of the present invention, there is provided an animal feeding device which includes a housing having an upstanding side wall defining a front opening, the housing further including an upper food storage compartment with a bottom discharge opening and a lower food receiving enclosure, a closure mounted to the housing and moveable between a first position closing the bottom discharge opening and a second position opening the bottom discharge opening, an arm means mounted to the housing and operable to move the closure between the first and second positions, and a biasing means for biasing the closure to the closed position.

It is an object of the present invention to provide a device for feeding animals which is operable by the animal and does not require the presence of the owner for each feeding.

It is another object of the present invention to provide an animal feeding device which will contain and dispense a significant amount of animal food over an extended period of time, and which will protect the food prior to its being dispensed.

A further object of the present invention is to provide an animal feeding device which is attractive in appearance, economical and reliable in construction, and relatively inexpensive.

It is another object of the present invention to provide an animal feeding device which is operable by the animal, and which is adapted for readily training the animal as to the operation of the device.

It is a further object of the present invention to provide an animal feeding device which is configured to be particularly adapted for use by a cat, and which minimizes or eliminates accessibility to certain other animals such as dogs.

Further objects and advantages of the present invention will become apparent from the description of the preferred embodiment which follows.

DESCRIPTION OF THE PREFERRED EMBODIMENT

Figure 3:
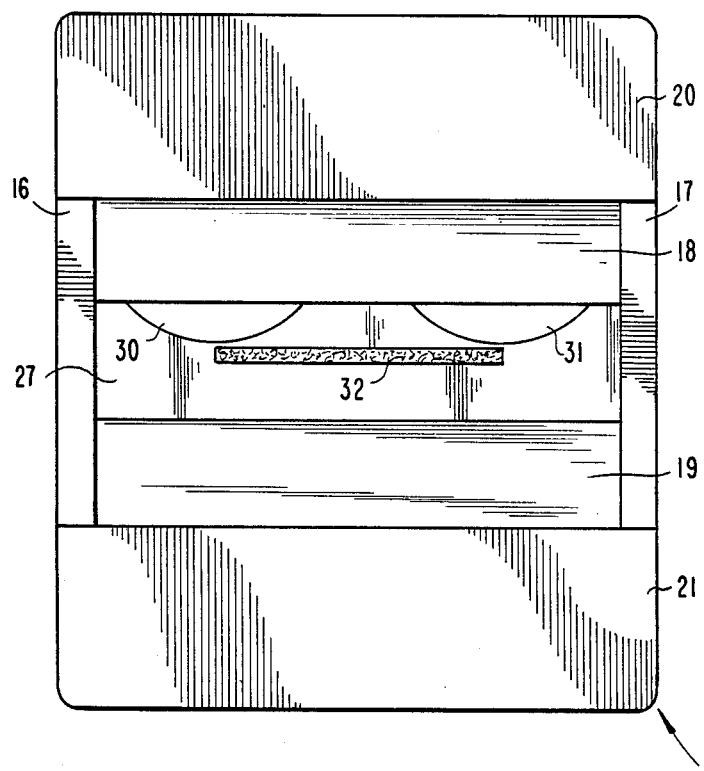
FIG. 3 is a top view of the device of FIG. 2, showing in particular the position of the closure with the engagement position of FIG. 2.
Figure 1:
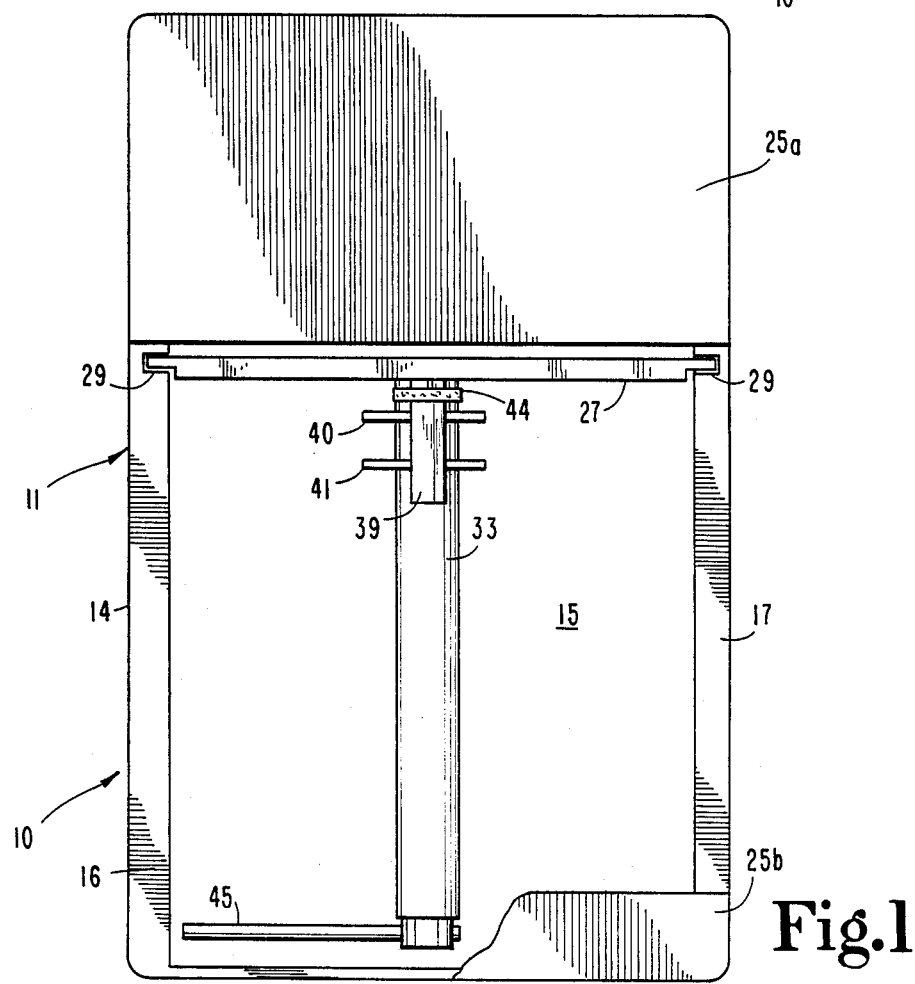
FIG. 1 is a front, elevational view of the preferred embodiment of the animal feeding device of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The general design of the feeder divides a box into a hopper above an eating compartment. A vertical lever moves a slide to expose openings through which dry food falls from the hopper. A removable deflector deflects food to the back of the eating compartment. On the bottom of the lever, a horizontal bar fits for training to provide both a pulling handle and a barricade for bait food. As an animal paws for food behind this bar, it learns that the lever causes food to drop. The bar is eventually removed to inhibit operation by certain animals, such as dogs. The vertical lever itself must then be pulled, an operation designed, for example, to be as difficult for a dog as it is easy for a cat.

Referring in particular to the drawings, the feeder 10 includes a housing 11 defining an upper, food storage compartment 12, and a lower food receiving enclosure 13. The housing comprises an enclosure 14 including a back wall 15 and side walls 16 and 17. A pair of angled walls 18 and 19 define the lower portion of the food storage compartment 12.

Rear and front top walls 20 and 21 combine with the lid 22 to form a cover for the storage compartment. A pair of flanges 23 and 24 extend outwardly from the bottom of the lid 22 to engage with the undersides of the front and rear top walls to secure the lid in place. The lid is sized to permit the longer flange 23 to be first inserted under the rear wall, and then the lid is slid forward to engage the front flange 22 with the underside of the front top wall 21.

The housing 11 further includes a pair of front walls 25a and 25b, and a floor 26. The front wall 26 and floor 26 combine with the sides walls 16 and 17 and the back wall 15 to form the food-receiving enclosure 13.

Figure 2:
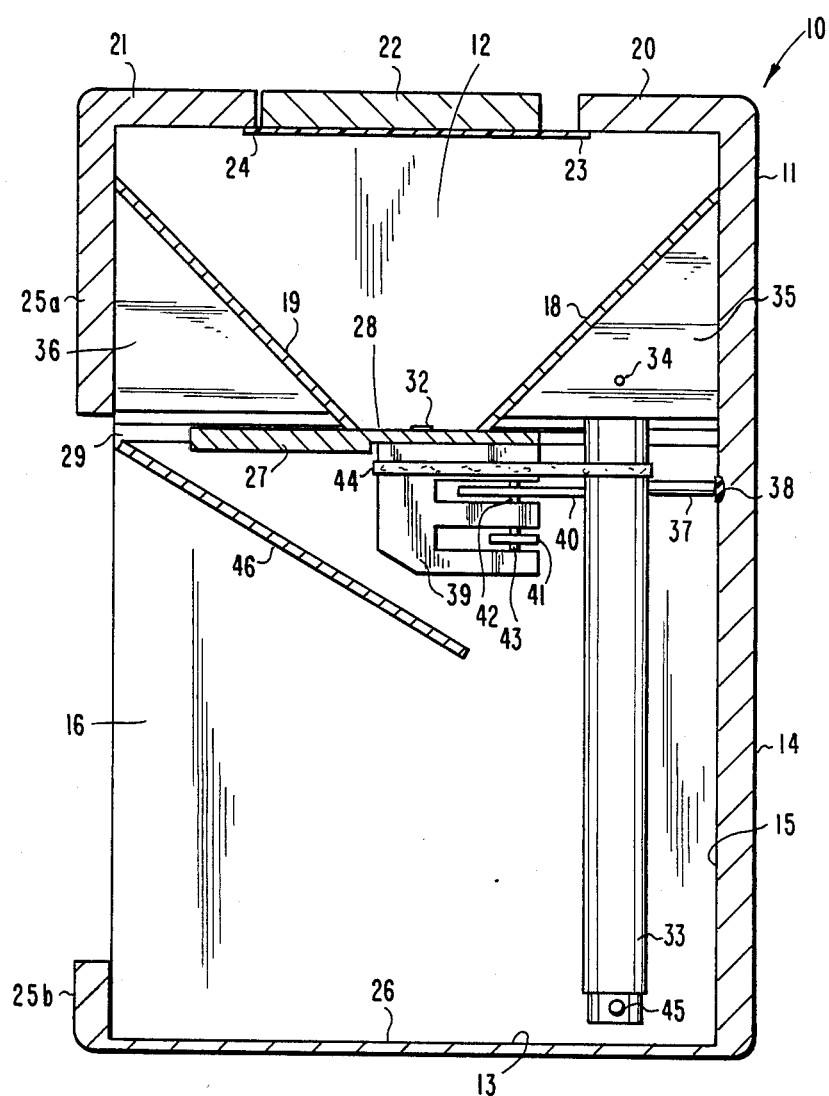
FIG. 2 is a side, cross-sectional view of the device of FIG. 1, showing one engagement position of the arm with the closure.
Figure 6:
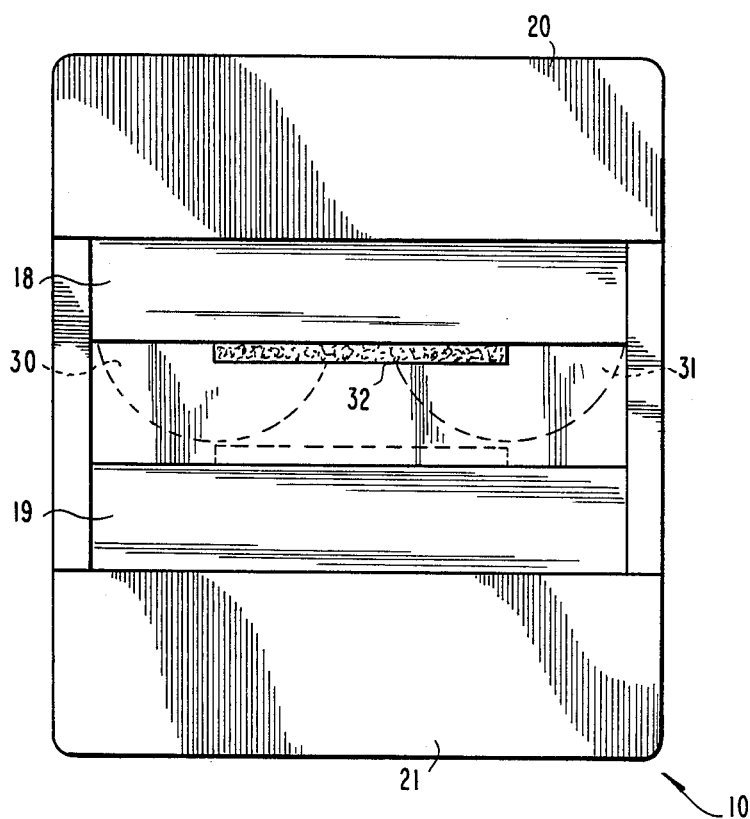
FIG. 6 is a top view of the device in FIG. 1, showing the closure in the closed and open positions.

A closure 27 is provided to permit food to be dispensed from the food storage compartment upon activation by the feeding animal. The angled walls 18 and 19 are spaced apart at their lower ends to define a bottom discharge opening 28. The closure is moveable between a first position closing the discharge opening and a second position opening the discharge opening. Referring in particular to FIG. 2, it is shown that the closure 27 is received within slots, such as 29, and is slideable therein. The closure includes a pair of openings 30 and 31 (FIG. 3). In the closed position, shown in FIG. 6, the openings are displaced from the discharge opening and food is retained within the storage compartment. In the open position (shown in dashed lines in FIG. 6), the openings 30 and 31 are aligned with the discharge opening 28 and food may fall through the holes to the food-receiving enclosure 13. A roughened strip 32 is positioned within the area of the discharge opening when the closure is in the closed position, and operates to help move the food as the closure is slid between the first and second positions, thereby preventing the food from becoming clogged and failing to fall through the openings.

An arm and engagement means are provided for operation of the sliding closure 27. The arm means includes an arm which is moveable by the feeding animal. The arm is engaged with the closure such that movement of the arm results in sliding of the closure between the first and second positions.

The arm 33 is pivotally mounted by pin 34 to a yoke 35 secured to the housing and bracing the angled wall 18. A brace 36 similarly supports the angled wall 19 to the housing. A rearwardly extending arm 37 acts as a stop for backward movement of the arm 33 by contacting the back wall 15 at a cushioned abutment 38.

Engagement of the arm 33 with the closure 27 is accomplished by means of a bracket 39 secured to the underside of the closure and configured to engage the arm. In particular, the bracket 39 includes a pair of rotatable tabs 40 and 41 mounted by means of pivot pin 42. Rotation of the tabs results in selected engagement by either one of the tabs, or by the bracket itself, to vary the manner of engagement of the arm.

Figure 4:
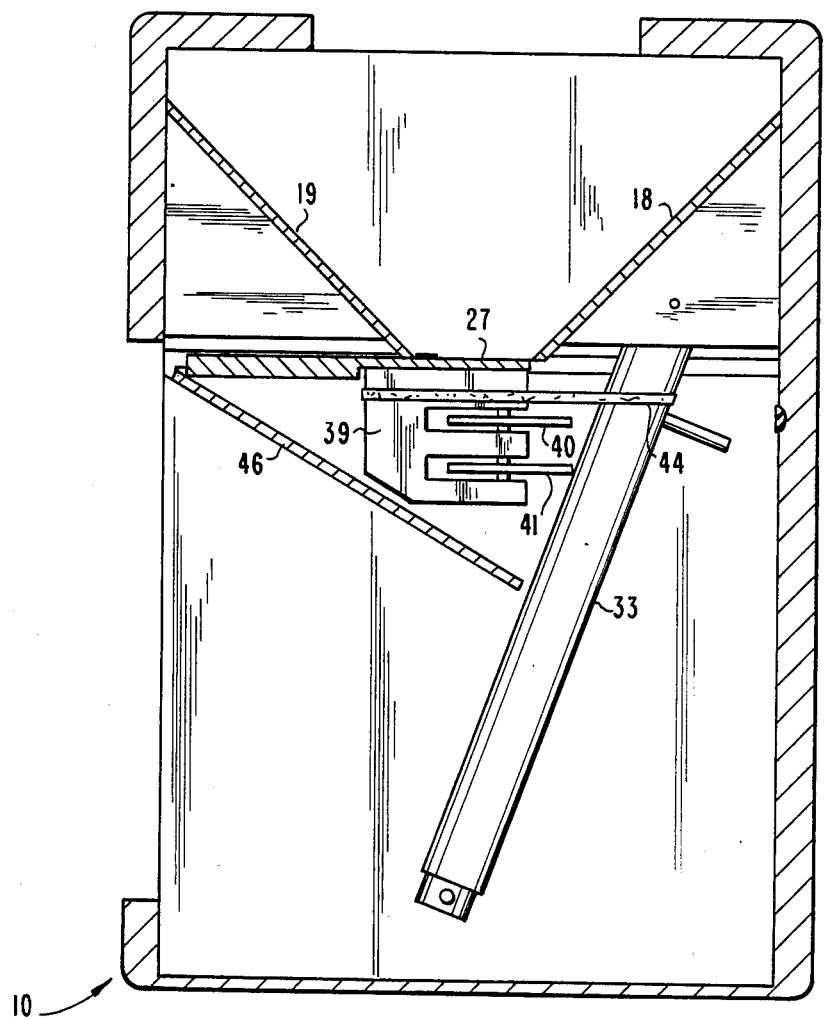
FIG. 4 is a side, cross-sectional view of the device of FIG. 1, showing a second engagement position of the arm with the closure, and showing the arm moving the closure to the open position.
Figure 5:
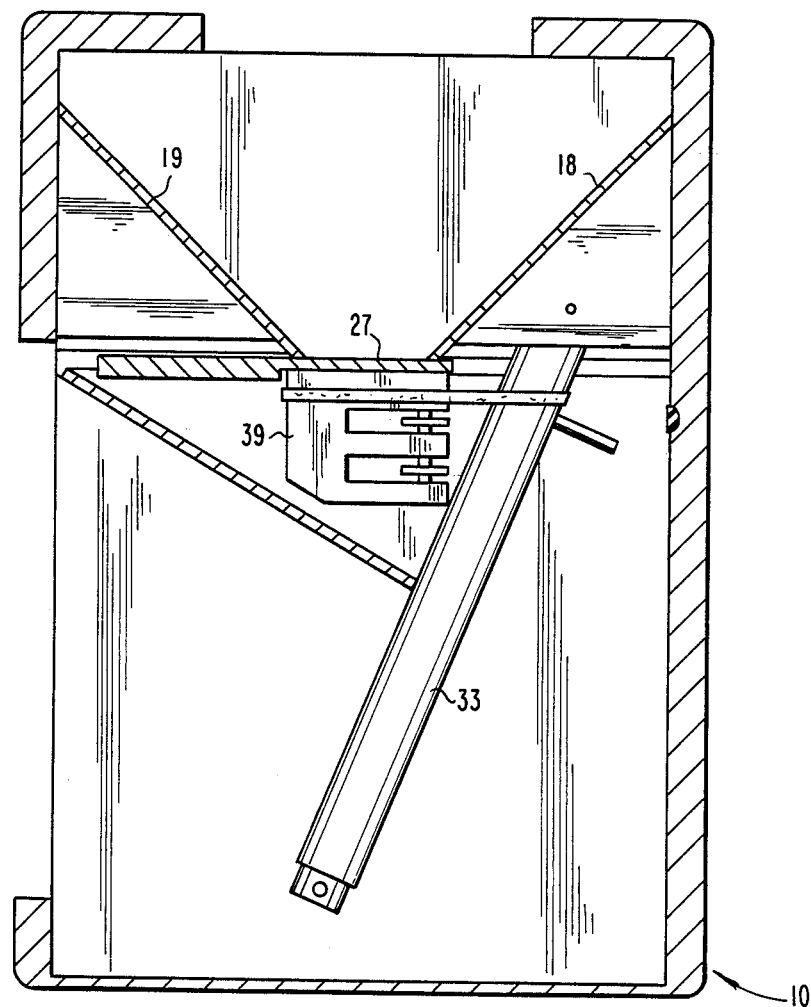
FIG. 5 is a side, cross-sectional view of the device of FIG. 1, with the arm in a third engagement condition with the closure, and the closure pulled into the open position.

Rotation of the first tab 40 as shown in FIG. 2 will result in the arm bearing against the tab as the arm is pulled forward. In this position, the placement of the point of engagement results in a requirement of only a light pull for the closure to be slid to the open position because the leverage has been increased and the closure openings are held partly exposed. If instead the second tab 41 is rotated to engage the arm, as shown in FIG. 4, then a greater pull is required to move the closure. As a third option, both tabs may be rotated out of engagement with the arm, and the arm will bear directly on the bracket as shown in FIG. 5.

An elastic band 44 connects the arm 33 with the bracket 39 and biases the closure to the closed position. Referring for example to FIG. 4, it is shown that movement of the arm 33 causes the bracket to be moved away from the arm. The elastic band is therefore stretched when the closure is moved toward the open position. Upon release of the arm 33, the elastic band will contract, forcing the bracket and arm closer together and moving both to the starting position with the closure moved toward the closed position. The rearwardly extending arm 37 also acts to retain the elastic band in position on the arm, and therefore on the bracket as well.

The tension on the arm 33 reflects three considerations. The pull required for release of the food should be a comfortable, though deliberate, effort for the desired animal, such as a cat. The return force should be sufficient to close the sliding closure, and also desirably to aid in moving the food to prevent clogging or "hang-up." Also, if desired the arm should be resistant to the efforts of undesired animals, such as dogs. Therefore, by design, the arm pull is beyond the initial "pussy-footing" of untrained animals, such as cats. Instead, the operation of the feeding device is desirably the result of easily learned behavior requiring a deliberate action by the animal to dispense food.

A lever arm 45 may be removably attached to the bottom of the arm 33. This arm is rotatable to extend in any horizontal direction from the arm 33. It serves both as a pulling handle and as a barricade for bait food used in training the feeding animal. Upon removal of the additional lever arm 45, the device is made more difficult to operate, thus resisting operation by untrained animals or animals which are less dexterous than the intended animal.

The inclusion of adjustable engagement between the arm 33 and the closure 27 facilitates the training of an animal to use the feeding device. For example, the use of different engagement tabs 40 and 41 permits the owner of the device to vary the engagement settings, thereby changing the amount of force required to dispense food.

As previously indicated, a first position for the device 10 is with the first engagement tab 40 turned to abut the arm 33. This results in only a light movement of the arm being necessary to dispense food. In fact, in this setting the closure is actually positioned with a portion of the openings 30 and 31 overlapping the discharge opening 28, as shown in FIG. 3. The feeding animal will learn that the arm 33 causes food to drop when the animal paws for pieces placed behind the lever arm 45.

When the animal is consistently dropping food for itself, then the bottom tab 41 is turned to engage the arm 33. This setting requires an intermediate amount of force and movement of the arm 33 to dispense food. Once this position has been mastered, the tabs are turned such that engagement of the arm occurs directly with the lower portion of the bracket 39.

The lever arm 45 is rotatable to facilitate training. The arm 45 may be turned to one side or the other, depending on which seems to best suit the animal using the device. As the training continues, the arm can be gradually turned in the direction facing directly out of the device, thus decreasing the degree to which the lever arm 45 may be used to operate the device. Eventually the lever arm may be removed, and movement of the arm 33 must be accomplished by direct manipulation of the arm 33.

In one aspect of the present invention, the device may be used for the selective feeding of one type of animal over another. For example, the dexterity of a cat is such that it may manipulate a device while a dog would not be able to do so. The cat's more flexible wrist allows it to pull the vertical lever naturally, while a dog tends to keep pushing to no avail with its crude licking and digging efforts.

The specifics of the feeder design for cats are shaped by four overlappiing areas of consideration. The physical aspects of dry cat food affect the size of the closure openings 30 and 31 and the ratio of closure-to-arm movement. The closure 27 surface has a roughened area to overcome the tendency of dry foods to lock in a self-contained matrix that stops delivery. So that the feeder can work with all brands of dry food, the tabs 40 and 41 may each have two settings to accommodate different sizes of food particles during training.

Feline features control the size of the eating compartment, the distance of the pull, the resistance of the arm 33 (variable, for training), etc. Though food will continue to fall from the food storage hopper 12 as long as the arm is held forward, cats almost inevitably release the arm 33 to capture the first pieces of food that fall. Thus, small amounts are dropped and eaten in sequence, and when the cat walks away the eating compartment is usually empty. The makers of some dry cat foods suggest that cats generally will not over-eat and recommend that their product be left constantly available for cats to nibble. The feeder allows this convenience without the attendant waste and mess that accompanies a large open dish of dry cat food.

Canine characteristics include a healthy appetite for cat food. Efforts by pet owners to protect their cat's food are legendary. The feeder is designed to be "dog-proof" in the sense that access to the food it holds is gained by pulling a vertical arm. Once the horizontal lever arm 45 has been removed, the digging motions typical to a dog's efforts will push the arm back, to no reward. The dog can only pick up stray pieces of food that the cat may have left behind. This happy state of affairs is predicated on the cat having a head-start in practice using the lever arm 45 (along with tabs 40 and 41 settings). Also, it is intended that dogs will not be encouraged to assault the feeder, that the "dog-proofness" of the feeder be a part of normal owner discipline and control.

The nature of humans requires that there be minimal training required with the feeder. However, for this device the training is not really training, but rather is a shaping of the cats' behavior with a couple of easy, minor adjustments. The learning is inherent in the design of the box.

Many cats have to live with dogs. Their food is in constant jeopardy and they are unable to enjoy a sensible diet of snacks throughout the day. The feeder is a dispenser for dry food that a cat can work itself. It keeps a week's supply safe from canine appetites and eliminates the mess around open feeding dishes. Cats develop an affection for the feeder that makes their performance an engaging spectacle. As well as being safe, clean, efficient, easy, etc., the feeder is intended to appeal to the human imagination. It is not so much amusing as it is satisfying to watch a cat use the feeder. Anyone who likes their cat shares in enjoying its accomplishments. The feeder becomes a means of communication, a major link in the chain of mutual interests that unite cats and their owners.

As described, the present invention provides a feeding device which is operable by the animal, and does not require the presence of the owner for each feeding. The sizes and other parameters of the various components described may be adjusted to suit particular requirements for the animal for which the device is to be used. Various features of the device may be modified without materially changing the operation of the device. Further, additional features may be employed to complement those described. By way of example, a deflector wall 46 is secured to the housing to deflect food falling from the upper compartment to the food-receiving enclosure. Other modifications may similarly be employed without departing from the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An animal feeding device for dispensing dry food to a non-human which comprises:

a housing defining an upper food storage compartment having a bottom discharge opening, said housing including rear and side walls extending downwardly from the food storage compartment and a bottom, the rear and side walls and bottom defining a lower food receiving enclosure having a front opening;

a closure movably mounted to said housing, said closure having a first position closing the bottom discharge opening of the upper food storage compartment and retaining food within the compartment, said closure having a second position opening the bottom discharge opening and allowing food to fall from the upper food storage compartment into the lower food receiving enclosure, said housing including an upstanding wall defining a front opening;

arm means mounted to said housing and including an arm for engaging said closure and moving said closure between the first and second positions, movement of said arm means providing a resultant movement of said closure between the first and second positions, said arm means including an arm accessible to an animal through the front opening of said housing, the arm extending vertically and being pivotally attached to said housing at the top end of the arm, the arm having a first position located a first distance from the rear wall and a second position space farther from the rear wall than in the first position, said closure being in the first position when the arm is in the first position and said closure being in the second position when the arm is in the second position;

adjustable engagement means for engaging said arm means with said closure, said engagement means providing differing engagements between said closure and said arm means to selectively provide variable leverage by said arm means, said arm means providing different movement of said closure for the different engagements between said arm means and said closure; and biasing means for biasing said closure to the closed position, in which said adjustable engagement means includes a plurality of engagement blocks located between said arm means and said closure, each of the engagement blocks being positionable to engage between said arm means and said closure, each engagement block providing a different engagement to provide different movement of said closure in response to movement of said arm means, said engagement means including means for selectively positioning one of the engagement blocks between said arm means and said closure.

2. The device of claim 1 in which said adjustable engagement means comprises means for selectively pivoting each of the engagement blocks between a non-engagement position and an engagement position.

3. An animal feeding device for dispensing dry food to a non-human which comprises:

a housing defining an upper food storage compartment having a bottom discharge opening, said housing including rear and side walls of extending downwardly from the food storage compartment and a bottom, the rear and side walls and bottom defining a lower food receiving enclosure having a front opening;

a closure movably mounted to said housing, said closure having a first position closing the bottom discharge opening of the upper food storage compartment and retaining food within the compartment, said closure having a second position opening the bottom discharge opening and allowing food to fall from the upper food storage compartment into the lower food receiving enclosure, said housing including an upstanding wall defining a front opening;

arm means mounted to said housing and including an arm for engaging said closure and moving said closure between the first and second positions, movement of said arm means providing a resultant movement of said closure between the first and second positions, said arm means including an arm accessible to an animal through the front opening of said housing, the arm extending vertically and being pivotally attached to said housing at the top end of the arm, the arm having a first position located a first distance from the rear wall and a second position space farther from the rear wall than in the first position, said closure being in the first position when the arm is in the first position and said closure being in the second position when the arm is in the second position;

adjustable engagement means for engaging said arm means with said closure, said engagement means providing differing engagements between said closure and said arm means to selective provide variable leverage by said arm means, said arm means providing different movement of said closure for the different engagements between said arm means and said closure; and biasing means for biasing said closure to the closed position.

4. The device of claim 3 in which said closure is slidably mounted to said housing, said arm means being for sliding said closure between the first and second positions.

5. The device of claim 3 and which further includes a deflector means for deflecting food discharged from the upper food storage compartment to the rear of the lower enclosure.

6. The device of claim 3 and which further includes a second arm removably mounted to the lower end of the arm of said arm means and extending horizontally therefrom.

* * * * *